United States Patent
Chen et al.

(10) Patent No.: US 11,653,102 B2
(45) Date of Patent: May 16, 2023

(54) IMAGE RETRIEVING APPARATUS HAVING IMAGE FLICKER DETECTION MECHANISM AND IMAGE FLICKER DETECTION METHOD OF THE SAME

(71) Applicant: REALTEK SEMICONDUCTOR CORPORATION, Hsinchu (TW)

(72) Inventors: Xiao-Yu Chen, Suzhou (CN); Dong-Yu He, Suzhou (CN); Yang Lu, Suzhou (CN); Gang Shen, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 36 days.

(21) Appl. No.: 17/355,238

(22) Filed: Jun. 23, 2021

(65) Prior Publication Data

US 2022/0191382 A1    Jun. 16, 2022

(30) Foreign Application Priority Data

Dec. 14, 2020   (CN) .......................... 202011475966.2

(51) Int. Cl.
  *H04N 5/235*    (2006.01)

(52) U.S. Cl.
  CPC ................. *H04N 5/2357* (2013.01)

(58) Field of Classification Search
  None
  See application file for complete search history.

(56) References Cited

U.S. PATENT DOCUMENTS

| 2015/0022686 A1* | 1/2015 | Wu ........................ H04N 5/144 348/226.1 |
| 2019/0253604 A1* | 8/2019 | Noda ................. H04N 5/23245 |

FOREIGN PATENT DOCUMENTS

| CN | 104104882 B | 8/2017 |
| CN | 111741290 A | 10/2020 |

OTHER PUBLICATIONS

OA letter of the counterpart TW application (appl. No. 110102116) dated May 30, 2022. Summary of the OA letter: 1. Claims 1~6, 9~10 are rejected as being unpatentable over the disclosure of the cited reference 1 (CN 104104882 B) and the cited reference 2 (CN 111741290 A). 2. Claims 7~8 are allowable. Correspondence bewteen claims of TW counterpart application and claims of US application: 1. Claims 1~10 in TW counterpart application correspond to claims 1~2 and 9~16 in US application, respectively.

* cited by examiner

*Primary Examiner* — Quan Pham
(74) *Attorney, Agent, or Firm* — WPAT, P.C

(57) ABSTRACT

The present disclosure discloses an image flicker detection method that includes the steps outlined below. An image retrieving is performed to retrieve a current image. A current variation ratio between first rows of pixels of the current image and second rows of pixels in a previous image is calculated. When both the current variation ratio and a previous variation ratio are determined to be larger than a ratio threshold, a detected flicker number is incremented. When the detected flicker number is determined to be larger than a flicker number threshold, a flicker condition is determined to occur. When the detected flicker number is determined to be not larger than the flicker number threshold, the current image becomes the previous image and the current variation ratio becomes the previous variation ratio such that a next image becomes the current image to repeat the above steps.

16 Claims, 2 Drawing Sheets

IMAGE RETRIEVING APPARATUS HAVING IMAGE FLICKER DETECTION MECHANISM AND IMAGE FLICKER DETECTION METHOD OF THE SAME

BACKGROUND OF THE INVENTION

1. Field of the Invention

The present disclosure relates to an image retrieving apparatus having image flicker detection mechanism and an image flicker detection method of the same.

2. Description of Related Art

An artificial light source generates flicker due to the use of alternating current. Since the flicker frequency is high enough, human eyes are unable to perceive the flickers. However, for an image retrieving apparatus, the exposure time of light sensors thereof is short enough to document the flickers.

The image retrieving apparatus can be distinguished into a first type that includes an array of light sensors exposed simultaneously and a second type that includes a plurality of rows of light sensors exposed row by row. For the first type of image retrieving apparatus, the initial exposure time for each row of the light sensors is fixed. The artificial light source does not influence the retrieved image. However, for the second type of image retrieving apparatus, though the exposure time length of each row of the light sensors is the same, the initial exposure time thereof is different from each other. Under the influence of the light source, the detected brightness of each row of light sensors may be different such that the flickers are displayed in rows in the retrieved image, reminiscent of dynamic ripples. As a result, if the image retrieving apparatus is not equipped with flicker detection technology, the flicker issue cannot be addressed quickly.

SUMMARY OF THE INVENTION

In consideration of the problem of the prior art, an object of the present disclosure is to provide an image retrieving apparatus having image flicker detection mechanism and an image flicker detection method of the same.

The present disclosure discloses an image retrieving apparatus having image flicker detection mechanism that includes an image retrieving circuit, a storage circuit and a processing circuit. The image retrieving circuit includes a plurality of rows of light sensors and is configured to perform image retrieving row by row. The storage circuit is configured to store computer executable instructions. The processing circuit is configured to execute the computer executable instructions to further execute an image flicker detection method that includes the steps outlined below. A current image is retrieved by the image retrieving circuit. A current variation ratio between a plurality of first row-pixels of the current image and a plurality of corresponding second row-pixels in a previous image within a predetermined low frequency range is calculated. A detected flicker number is incremented when the current variation ratio is determined to be larger than a ratio threshold value and a previous variation ratio corresponding to the previous image is also determined to be larger than the ratio threshold. A flicker condition is determined to occur when the detected flicker number is determined to be larger than a flicker number threshold. The current image is set to be the previous image, the current variation ratio is set to be the previous variation ratio and a next image is retrieved by the image retrieving circuit to set the next image to be the current image when the detected flicker number is determined to be not larger than the flicker number threshold to repeat the above steps.

The present disclosure also discloses an image flicker detection method used in an image retrieving apparatus having image flicker detection mechanism that includes the steps outlined below. A current image is retrieved by an image retrieving circuit including a plurality of rows of light sensors and configured to perform image retrieving row by row. A current variation ratio between a plurality of first row-pixels of the current image and a plurality of corresponding second row-pixels in a previous image within a predetermined low frequency range is calculated. A detected flicker number is incremented when the current variation ratio is determined to be larger than a ratio threshold value and a previous variation ratio corresponding to the previous image is also determined to be larger than the ratio threshold. A flicker condition is determined to occur when the detected flicker number is determined to be larger than a flicker number threshold. The current image is set to be the previous image, the current variation ratio is set to be the previous variation ratio and a next image is retrieved by the image retrieving circuit to set the next image to be the current image when the detected flicker number is determined to be not larger than the flicker number threshold to repeat the above steps.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide an image retrieving apparatus having image flicker detection mechanism and an image flicker detection method of the same to continuously calculate a variation ratio between a current image and a previous image in a predetermined low frequency range to determine a detected flicker number, to further determine that the flicker condition occurs when the detected flicker number is larger than a flicker number threshold.

Figure 1:
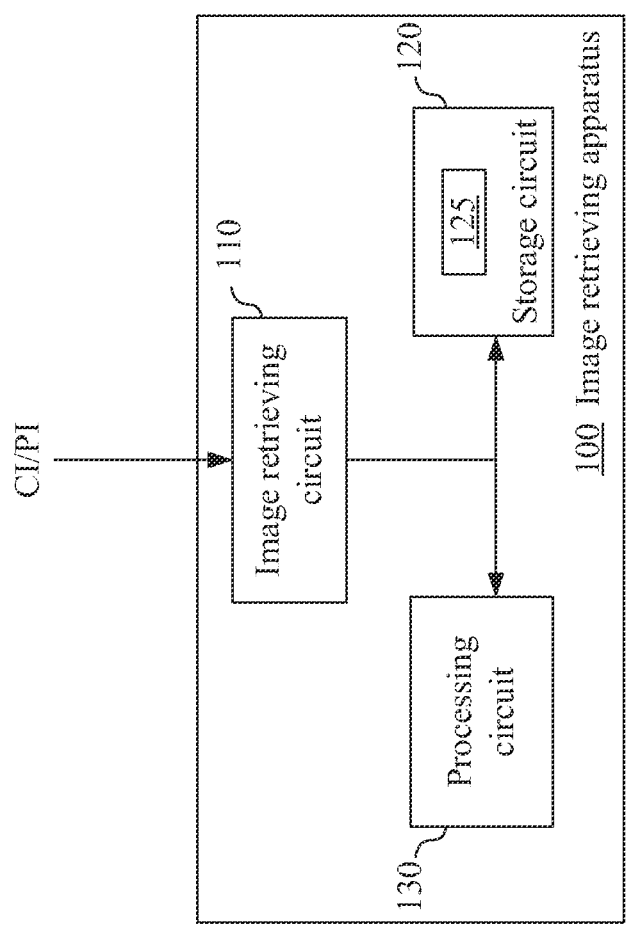
FIG. 1 illustrates a block diagram of an image retrieving apparatus having image flicker detection mechanism according to an embodiment of the present invention.

Reference is now made to FIG. 1. FIG. 1 illustrates a block diagram of an image retrieving apparatus 100 having image flicker detection mechanism according to an embodiment of the present invention. The image retrieving apparatus 100 includes an image retrieving circuit 110, a storage circuit 120 and a processing circuit 130.

The image retrieving circuit 110 includes light sensors (not illustrated in the figure) arranged in an array. In every image retrieving time period, light exposure is performed by the light sensors row by row to perform image retrieving. The time length for each of the rows of light sensors to perform image retrieving is therefore called an exposure time.

The storage circuit 120 can be any storage device capable of storing data, such as but not limited to a random access memory (RAM), a read only memory (ROM) or a hard drive. It is appreciated that in different embodiments, the storage circuit 120 may include only one or more than one of the storage devices described above to store different types of data. In an embodiment, the storage circuit 120 is configured to store computer executable instructions 125.

The processing circuit 130 is electrically coupled to the image retrieving circuit 110 and the storage circuit 120, and is configured to retrieve and execute computer executable instructions 125 from the storage circuit 120. The computer executable instructions 125 includes firmware, driver and related instructions of the hardware modules that include such as, but not limited to the image retrieving circuit 110 and the storage circuit 120, so as to access the signal or data of the image retrieving circuit 110 and the storage circuit 120 to perform operation and further execute the function of the image retrieving apparatus 100.

The operation of the image retrieving apparatus 100 is described in detail in the following paragraphs.

Figure 2:
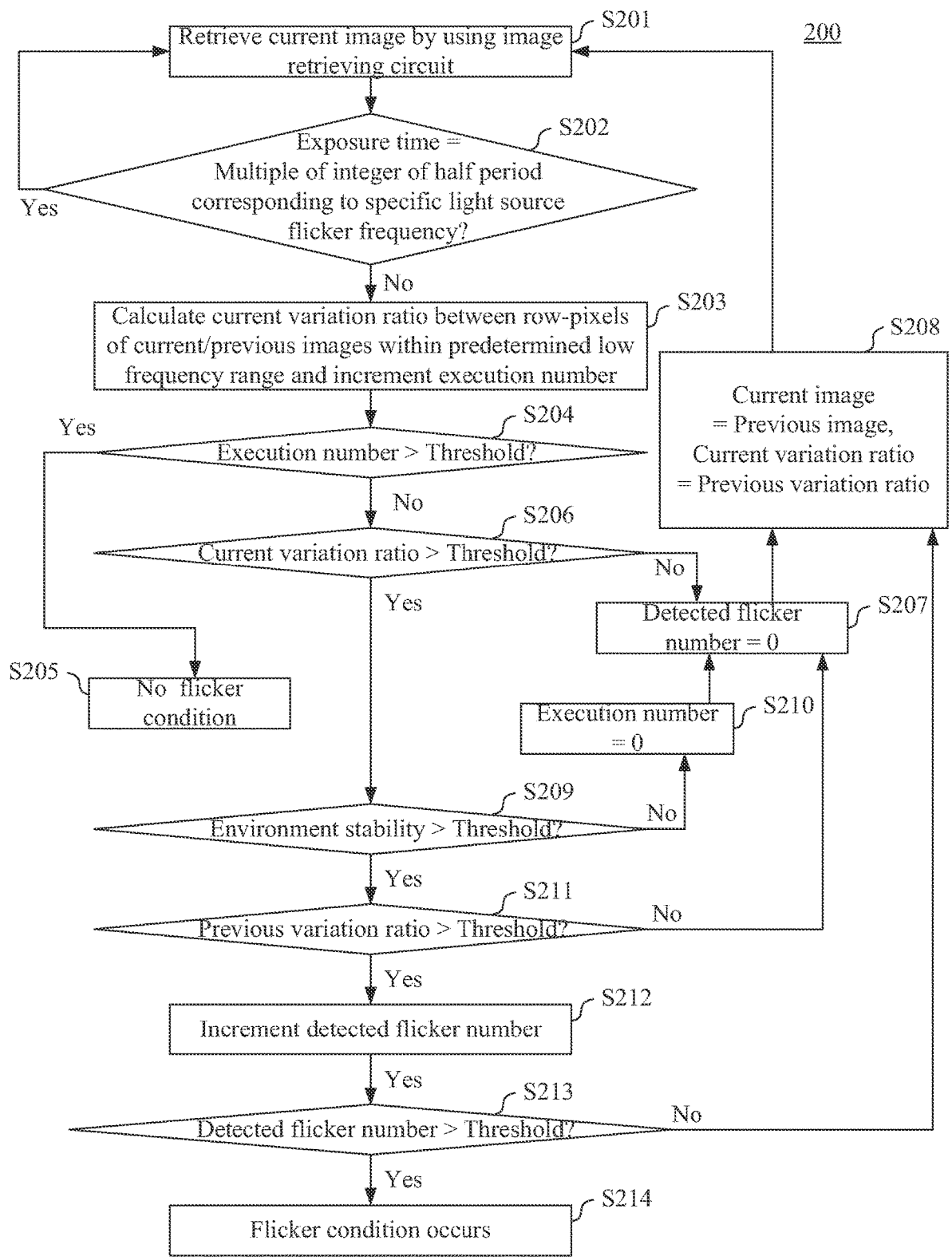
FIG. 2 illustrates a flow chart of an image flicker detection method according to an embodiment of the present invention.

Reference is now made to FIG. 2. FIG. 2 illustrates a flow chart of an image flicker detection method 200 according to an embodiment of the present invention. In an embodiment, the processing circuit 130 is able to retrieve the computer executable instructions 125 from the storage circuit 120 to execute the image flicker detection method 200. As illustrated in FIG. 2, an embodiment of the image flicker detection method 200 includes the following steps.

In step S201, a current image CI is retrieved by the processing circuit 130 by using the image retrieving circuit 110.

In step S202, whether an exposure time of the light sensors of the image retrieving circuit 110 is a multiple of an integer of a half period corresponding to a flicker frequency of a specific light source is determined by the processing circuit 130.

In an embodiment, the environment that the image retrieving circuit 110 is located may have a specific light source having a specific flicker frequency. The specific light source flicker frequency can be such as, but not limited to 50 Hertz or 60 Hertz. The corresponding half period is thus 10 milliseconds or 8.3 milliseconds (the latter one is an approximating value and has an actual value of 8.333 . . . ).

When the processing circuit 130 determines that the exposure time of the light sensors is a multiple of an integer of the half period corresponding to the flicker frequency of the specific light source (e.g. an exposure time of 50 milliseconds that is 5 times of 10 milliseconds and 6 times of 8.3 milliseconds), the image retrieving performed by the image retrieving circuit 110 is not influenced by such a light source. Under such a condition, the flow returns to step S201 to retrieve a next image as the current image CI to execute the image flicker detection method.

When the processing circuit 130 determines that the exposure time of the light sensors is not a multiple of an integer of the half period corresponding to the flicker frequency of the specific light source, the image retrieved by the image retrieving circuit 110 may include rows of pixels having different brightness generated due to such a light source, such that the flickers reminiscent of dynamic ripples are displayed among different rows. As a result, the subsequent steps of the image flicker detection method are required to be performed to determine whether a flicker condition actually happens in the image retrieved by the image retrieving circuit 110.

In step S203, a current variation ratio between a plurality of rows of first row-pixels of the current image CI and a plurality of rows of corresponding second row-pixels in a previous image PI within a predetermined low frequency range is calculated by the processing circuit 130, and an execution number of the execution of the image flicker detection method is also incremented by the processing circuit 130. The previous image PI can be such as, but not limited to an image retrieved by the image retrieving circuit 110 in a previous image retrieving time period and is stored in such as, but not limited to a storage circuit 120.

An example of the calculation of the current variation ratio is described in the following paragraphs.

In an embodiment, the processing circuit 130 may perform sampling once in every certain rows on the current image CI to obtain a plurality of row-pixels. For example, when H rows and W columns of the light sensors are included in the image retrieving circuit 110, the total number of rows of pixels in the current image CI is H and each of the rows includes W pixels. The processing circuit 130 may perform sampling once in every H/N rows on the current image CI to obtain N rows of sampled row-pixels. In a numerical example, when a total number of rows of the pixels in the current image CI is 100, and the processing circuit 130 tries to perform sampling to obtain 20 rows of row-pixels, the sampling is required to be performed once in every 5 (100/20) rows on the current image CI by the processing circuit 130. It is appreciated that the sampling method described above is merely an example. The present invention is not limited thereto.

Based on the above description, a corresponding relation of the i-th sampled row and the original number of row $h_i$ in the current image CI is expressed in the following equation:

$$h_i = i \times (H/N) \qquad \text{(equation 1)}$$

The processing circuit 130 further calculates a plurality of current pixel average values corresponding to the current image CI, wherein each of the current pixel average values corresponds to one row of the N rows of row-pixels sampled from the current image CI. When each of the pixel value in the i-th sampled row is cur_pixel($h_i$, j), the sum of all the pixel values of the i-th sampled row is expressed as the following equation:

$$\text{cur\_sum\_i} = \sum_{j=1}^{W} \text{cur\_pixel}(h_i, j) \qquad \text{(equation 2)}$$

In the above two equations, the range of i is 1~N. Further, the current pixel average values of the i-th sampled row can be generated by dividing the sum of all the pixel values by the number of columns (W) and can be expressed as the following equation:

$$\text{cur\_mean\_i} = \text{cur\_sum\_}i/W \qquad \text{(equation 3)}$$

Moreover, the processing circuit 130 calculates a plurality of previous pixel average values corresponding to the previous image PI, wherein each of the previous pixel average values corresponds to one row of the row-pixels of the previous image PI. The calculation method of the previous pixel average values is identical to the calculation method of the current pixel average values of the current image CI, in which the processing circuit 130 performs sampling on the rows in the previous image PI corresponding to the sampled rows in the current image CI (e.g., when the 15-th row of the current image CI is the sampled row, the 15-th row of the previous image PI is also the sampled row), such that sums of all the pixels, wherein each of the sums corresponding to one of the sampled rows, is calculated (e.g., the pixels in one sampled row in the current image CI is called one row of the first row pixels and the pixels in one corresponding sampled row in the previous image PI is called one row of the second row pixels). The previous pixel average values can be calculated subsequently, in which the detail is not described herein. The previous pixel average value of the i-th sampled row is expressed as prev_mean_i. The range of i is 1~N.

The processing circuit 130 further calculates a plurality of pixel average difference values between to the current pixel average values and the previous pixel average values. The pixel average difference value corresponding to the i-th sampled row can be expressed as the following equation:

$$\text{sub}\_i = \text{cur\_mean}\_i - \text{prev\_mean}\_i \quad \text{(equation 4)}$$

The range of i is 1~N. As a result, the N pixel average difference values sub_i can be expressed as the following equation in the form of a number series array_sub:

$$\text{array\_sub}[i] = \text{sub}\_i \quad \text{(equation 5)}$$

The processing circuit 130 performs fast Fourier transform on the pixel average difference values to generate a complex number series expressed as the following equation:

$$\text{array\_fft} = FFT(\text{array\_sub}) \quad \text{(equation 6)}$$

The processing circuit 130 performs modulo operation on a plurality of series elements of a former part of the complex number series (e.g., the elements corresponding to the range 1~N/2 of i) to generate a frequency series expressed as the following equation:

$$\text{array\_freq}[i] = \text{MOD}(\text{array\_fft}[i]) \quad \text{(equation 7)}$$

Subsequently, the processing circuit 130 calculates a sum of low frequency series elements in the frequency series corresponding to a predetermined low frequency range (e.g., corresponding to the range th1~th2 of i) except direct current components (corresponding to the range of i that is smaller than th1). The processing circuit 130 also calculates a sum of all of the frequency series elements of the frequency series except the direct current components (corresponding to the range of i that is smaller than th1). The calculation can be expressed as the following two equations:

$$\text{low\_freq\_sum} = \sum_{i=th1}^{th2} \text{array\_freq}[i] \quad \text{(equation 8)}$$

$$\text{freq\_sum} = \sum_{i=th1}^{N/2} \text{array\_freq}[i] \quad \text{(equation 9)}$$

Further, the processing circuit 130 calculates the ratio between the above two sums and assigns the sum ratio to be the current variation ratio RA. The current variation ratio RA is thus expressed as the following equation:

$$RA = \text{low\_freq\_sum}/\text{freq\_sum} \quad \text{(equation 10)}$$

As a result, the processing circuit 130 can determine whether the pixel differences between the current image CI and the previous image PI are larger in the predetermined low frequency range based on the calculation described above. It is appreciated that the calculation method described above is merely an example. In other embodiments, other calculation methods and other settings of range can be used to determine the degree of difference between the pixels of the current image CI and the previous image PI in the predetermined low frequency range. When step S203 is finished being performed, the execution number of the image flicker detection method is increased by 1.

In step S204, whether the execution number is larger than a predetermined detection number threshold is determined by the processing circuit 130.

In step S205, when the execution number is larger than the detection number threshold, it is determined that the flicker condition does not occur by the processing circuit 130. In other words, the condition that the execution number is larger than the detection number threshold means that the flicker condition generated by the light source is not detected in a multiple times of detection. Under such a condition, the image flicker detection method 200 is stopped to be further performed.

In step S206, when the execution number is not larger than the detection number threshold, whether the current variation ratio is larger than a predetermined ratio threshold value (e.g., 20%, however the present invention is not limited thereto) is further determined by the processing circuit 130.

In step S207, when the current variation ratio is not larger than the ratio threshold value, a detected flicker number (the detail of such a number is described in the subsequent paragraphs) is set to be zero by the processing circuit 130.

In step S208, the current image is set to be the previous image and the current variation ratio is set to be the previous variation ratio by the processing circuit 130. Further, the method executed by the processing circuit 130 returns to step S201 to retrieve the next image by the image retrieving circuit 110 to set the next image to be the current image CI to repeat the subsequent steps. In other words, in the current image is set as the previous image as reference, and the next image is inputted as the current image.

In step S209, when the current variation ratio is larger than the ratio threshold value, whether an environment stability is larger than a stability threshold of the current image CI is determined by the processing circuit 130.

In an embodiment, processing circuit 130 determines the environment stability based on the difference of the exposure time and the exposure gain of the light sensors between the current image CI and the previous image PI.

More specifically, when an exposure time difference between an exposure time of the light sensors corresponding to the current image CI and a previous exposure time of the light sensors corresponding to the previous image PI is larger than a time threshold value, or when an exposure gain difference between an exposure gain of the light sensors corresponding to the current image CI and a previous exposure gain of the light sensors corresponding to the previous image PI is larger than a gain threshold value, the processing circuit 130 determines that a larger variation of the environment corresponding to the retrieved images occurs such that a larger variation of either the exposure time or the exposure gain between the current image CI and the previous image PI occurs. As a result, the environment stability of the current image CI is determined to be not larger than the stability threshold by the processing circuit 130.

When both of the exposure time difference and the exposure gain difference are not larger than the corresponding threshold values, the processing circuit 130 determines that the environment corresponding to the retrieved images is stable such that no large variation of the exposure time and the exposure gain is required. As a result, the environment stability of the current image CI is determined to be larger than the stability threshold by the processing circuit 130.

It is appreciated that in different embodiments, the processing circuit 130 may perform determination of the environment stability based on either the current image CI and a former one of the previous image PI, or the current image CI and a multiple of previous images corresponding to a multiple of previous time spots. The present invention is not limited thereto.

In step S210, when the environment stability of the current image CI is not larger than the stability threshold, the execution number of the image flicker detection method is set to be zero by the processing circuit 130. More specifically, the processing circuit 130 determines that the environment may be changed so as to restart the image flicker detection method and the related number accumulation.

Subsequently, the flow enters step S207 and step S208, such that the detected flicker number is set to be zero, the current image is set to be the previous image and the current variation ratio is set to be the previous variation ratio by the processing circuit 130. Further, the method executed by the processing circuit 130 goes back to step S201 to retrieve the next image by the image retrieving circuit 110 to set the next image to be the current image CI to repeat the subsequent steps.

In step S211, when the environment stability of the current image CI is larger than the stability threshold, whether the previous variation ratio corresponding to the previous image PI is larger than the ratio threshold value is determined by the processing circuit 130.

When the previous variation ratio corresponding to the previous image PI is not larger than the ratio threshold value, the flow goes to step S207 and step S208, such that the detected flicker number is set to be zero, the current image is set to be the previous image and the current variation ratio is set to be the previous variation ratio by the processing circuit 130. Further, the method executed by the processing circuit 130 goes back to step S201 to retrieve the next image by the image retrieving circuit 110 to set the next image to be the current image CI to repeat the subsequent steps.

In step S212, when the previous variation ratio corresponding to the previous image PI is larger than the ratio threshold value, the variation ratios of the two consecutive images (i.e., the previous image PI and the current image CI) are both larger than the ratio threshold value. As a result, the flicker is determined to occur between the previous image PI and the current image CI and the detected flicker number is incremented by the processing circuit 130.

In step S213, whether the detected flicker number is larger than the flicker number threshold is determined by the processing circuit 130.

When the detected flicker number is not larger than the flicker number threshold, the flow returns to step S208 such that the current image is set to be the previous image and the current variation ratio is set to be the previous variation ratio by the processing circuit 130. Further, the method executed by the processing circuit 130 returns to step S201 to retrieve the next image by the image retrieving circuit 110 to set the next image to be the current image CI to repeat the subsequent steps.

In step S214, when the detected flicker number is larger than the flicker number threshold, the flicker condition is determined to occur by the processing circuit 130. In an embodiment, processing circuit 130 may proceed to perform such as, but not limited to a flicker-eliminating process when the flicker condition is determined to occur.

In some embodiments, the processing circuit 130 may adjust the exposure time of the light sensors of the image retrieving circuit 110 (e.g. set the exposure time to be a multiple of an integer of a half period corresponding to the flicker frequency of the specific light source) when the flicker condition is determined to occur, so as to prevent the flicker condition from occurring in the subsequent images.

In some embodiments, the processing circuit 130 may determine the frequency of the specific light source according to the flicker condition when the flicker condition is determined to occur. For example, in a usage scenario, the flicker condition is determined to occur when the exposure time is set to be a multiple of an integer of a half period corresponding to 50 Hertz, and is determined to not occur when the exposure time is set to be a multiple of an integer of a half period corresponding to 60 Hertz, in which such an exposure time is not a common multiple of the half period of 50 Hertz and 60 Hertz. The processing circuit 130 can thus determine that the frequency of the specific light source is 60 Hertz.

In some embodiments, the processing circuit 130 may determine whether an artificial light source that induces the flicker condition exists in the environment that the image retrieving circuit 110 is located according to the frequency of the specific light when the flicker condition is determined to occur. Whether the environment that the image retrieving circuit 110 is located is an indoor environment can be further determined. However, the subsequent process that the processing circuit 130 is able to perform in the present invention is not limited to the embodiments described above.

It is appreciated that the embodiments described above are merely an example. In other embodiments, it is appreciated that many modifications and changes may be made by those of ordinary skill in the art without departing, from the spirit of the invention.

In summary, the image retrieving apparatus having image flicker detection mechanism and the image flicker detection method of the same can continuously calculate a variation ratio between a current image and a previous image in a predetermined low frequency range to determine a detected flicker number, to further determine that the flicker condition occurs when the detected flicker number is larger than a flicker number threshold.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. An image retrieving apparatus having image flicker detection mechanism comprising:
    an image retrieving circuit comprising a plurality of rows of light sensors and configured to perform image retrieving row by row;
    a storage circuit configured to store computer executable instructions; and
    a processing circuit configured to execute the computer executable instructions to further execute an image flicker detection method comprising:
        retrieving a current image by the image retrieving circuit;
        calculating a current variation ratio between a plurality of rows of first row-pixels of the current image and a plurality of rows of corresponding second row-pixels in a previous image within a predetermined low frequency range;
        incrementing a detected flicker number when the current variation ratio is determined to be larger than a ratio threshold value and a previous variation ratio corresponding to the previous image is also determined to be larger than the ratio threshold value;

determining that a flicker condition occurs when the detected flicker number is determined to be larger than a flicker number threshold; and setting the current image to be the previous image, setting the current variation ratio to be the previous variation ratio and retrieving a next image by the image retrieving circuit to set the next image to be the current image when the detected flicker number is determined to be not larger than the flicker number threshold to repeat the above steps.

2. The image flicker detection apparatus of claim 1, wherein before the step of calculating the current variation ratio further comprises:

determining whether an exposure time of the light sensors is a multiple of an integer of a half period corresponding to a flicker frequency of a specific light source;

retrieving the next image by the image retrieving circuit to set the next image to be the current image when the exposure time of the light sensors is the multiple of the integer of the half period corresponding to the flicker frequency of the specific light source to repeat the above steps; and calculating the current variation ratio when the exposure time of the light sensors is not the multiple of the integer of the half period corresponding to the flicker frequency of the specific light source.

3. The image flicker detection apparatus of claim 2, wherein the flicker frequency of the specific light source is 50 Hertz or 60 Hertz.

4. The image flicker detection apparatus of claim 1, wherein the step of calculating the current variation ratio further comprises:

accumulating an execution number of the image flicker detection method; and determining that the flicker condition does not occur when the execution number is larger than a detection number threshold.

5. The image flicker detection apparatus of claim 4, further comprising:

setting the execution number and the detected flicker number to be zero when an environment stability of the current image is not larger than a stability threshold; and setting the current variation ratio to be the previous variation ratio and retrieving the next image by the image retrieving circuit to set the next image to be the current image to repeat the above steps.

6. The image flicker detection apparatus of claim 5, further comprising:

determining that the environment stability is not larger than the stability threshold when an exposure time difference between an exposure time of the light sensors corresponding to the current image and a previous exposure time of the light sensors corresponding to the previous image is larger than a time threshold value, or when an exposure gain difference between an exposure gain of the light sensors corresponding to the current image and a previous exposure gain of the light sensors corresponding to the previous image is larger than a gain threshold value.

7. The image flicker detection apparatus of claim 1, further comprising:

setting the detected flicker number to be zero when one of the current variation ratio and the previous variation ratio is not larger than the ratio threshold value; and setting the current variation ratio to be the previous variation ratio and retrieving the next image by the image retrieving circuit to set the next image to be the current image to repeat the above steps.

8. The image flicker detection apparatus of claim 1, wherein the step of calculating the current variation ratio further comprises:

calculating a plurality of current pixel average values corresponding to the current image, wherein each of the current pixel average values corresponds to one row of the first row-pixels;

calculating a plurality of previous pixel average values corresponding to the previous image, wherein each of the previous pixel average values corresponds to one row of the second row-pixels;

calculating a plurality of pixel average difference values between to the current pixel average values and the previous pixel average values;

performing fast Fourier transform on the pixel average difference values to generate a complex number series;

performing modulo operation on a plurality of series elements of a former part of the complex number series to generate a frequency series; and calculating a sum ratio between a plurality of low frequency series elements in the frequency series corresponding to the predetermined low frequency range and all of a plurality of frequency series elements of the frequency series, and assigning the sum ratio to be the current variation ratio.

9. An image flicker detection method used in an image retrieving apparatus having image flicker detection mechanism, comprising:

retrieving a current image by an image retrieving circuit comprising a plurality of rows of light sensors and configured to perform image retrieving row by row;

calculating a current variation ratio between a plurality of rows of first row-pixels of the current image and a plurality of rows of corresponding second row-pixels in a previous image within a predetermined low frequency range;

incrementing a detected flicker number when the current variation ratio is determined to be larger than a ratio threshold value and a previous variation ratio corresponding to the previous image is also determined to be larger than the ratio threshold value;

determining that a flicker condition occurs when the detected flicker number is determined to be larger than a flicker number threshold; and setting the current image to be the previous image, setting the current variation ratio to be the previous variation ratio and retrieving a next image by the image retrieving circuit to set the next image to be the current image when the detected flicker number is determined to be not larger than the flicker number threshold to repeat the above steps.

10. The image flicker detection method of claim 9, wherein before the step of calculating the current variation ratio further comprises:

determining whether an exposure time of the light sensors is a multiple of an integer of a half period corresponding to a flicker frequency of a specific light source;

retrieving the next image by the image retrieving circuit to set the next image to be the current image when the exposure time of the light sensors is the multiple of the integer of the half period corresponding to the flicker frequency of the specific light source to repeat the above steps; and calculating the current variation ratio when the exposure time of the light sensors is not the multiple of the integer of the half period corresponding to the flicker frequency of the specific light source.

11. The image flicker detection method of claim 10, wherein the flicker frequency of the specific light source is 50 Hertz or 60 Hertz.

12. The image flicker detection method of claim 9, wherein the step of calculating the current variation ratio further comprises:

accumulating an execution number of the image flicker detection method; and determining that the flicker condition does not occur when the execution number is larger than a detection number threshold.

13. The image flicker detection method of claim 12, further comprising:

setting the execution number and the detected flicker number to be zero when an environment stability of the current image is not larger than a stability threshold; and setting the current variation ratio to be the previous variation ratio and retrieving the next image by the image retrieving circuit to set the next image to be the current image to repeat the above steps.

14. The image flicker detection method of claim 13, further comprising:

determining that the environment stability is not larger than the stability threshold when an exposure time difference between an exposure time of the light sensors corresponding to the current image and a previous exposure time of the light sensors corresponding to the previous image is larger than a time threshold value, or when an exposure gain difference between an exposure gain of the light sensors corresponding to the current image and a previous exposure gain of the light sensors corresponding to the previous image is larger than a gain threshold value.

15. The image flicker detection method of claim 9, further comprising:

setting the detected flicker number to be zero when one of the current variation ratio and the previous variation ratio is not larger than the ratio threshold value; and setting the current variation ratio to be the previous variation ratio and retrieving the next image by the image retrieving circuit to set the next image to be the current image to repeat the above steps.

16. The image flicker detection method of claim 9, wherein the step of calculating the current variation ratio further comprises:

calculating a plurality of current pixel average values corresponding to the current image, wherein each of the current pixel average values corresponds to one row of the first row-pixels;

calculating a plurality of previous pixel average values corresponding to the previous image, wherein each of the previous pixel average values corresponds to one row of the second row-pixels;

calculating a plurality of pixel average difference values between to the current pixel average values and the previous pixel average values;

performing fast Fourier transform on the pixel average difference values to generate a complex number series;

performing modulo operation on a plurality of series elements of a former part of the complex number series to generate a frequency series; and calculating a sum ratio between a plurality of low frequency series elements in the frequency series corresponding to the predetermined low frequency range and all of a plurality of frequency series elements of the frequency series, and assigning the sum ratio to be the current variation ratio.

* * * * *